(12) United States Patent
Arlon et al.

(10) Patent No.: US 7,204,336 B2
(45) Date of Patent: Apr. 17, 2007

(54) MOTOR HEADLIGHT COMPRISING AN IMPACT MEMBER

(75) Inventors: Philippe Arlon, Bobigny Cedex (FR); Laurence Marechal, La Verriere Cedex (FR); Pascal Harand, La Verriere Cedex (FR); Francois Boumaza, La Verriere Cedex (FR)

(73) Assignee: Valeo Vision, Cedex (FR)

( * ) Notice: Subject to any disclaimer, the term of this patent is extended or adjusted under 35 U.S.C. 154(b) by 358 days.

(21) Appl. No.: 10/664,515

(22) Filed: Sep. 16, 2003

(65) Prior Publication Data

US 2004/0108156 A1 Jun. 10, 2004

(30) Foreign Application Priority Data

Sep. 20, 2002 (FR) .................................. 02 11709

(51) Int. Cl.
*B60K 28/10* (2006.01)
(52) U.S. Cl. ................ 180/274; 362/306; 362/468; 362/527
(58) Field of Classification Search ............... 180/274; 296/187.04; 362/507, 526, 527, 549, 306, 362/466, 467, 468
See application file for complete search history.

(56) References Cited

U.S. PATENT DOCUMENTS

| 4,475,148 | A | | 10/1984 | Tomforde | |
|---|---|---|---|---|---|
| 5,863,107 | A | * | 1/1999 | Dobler et al. | 362/475 |
| 6,190,030 | B1 | * | 2/2001 | Chase | 362/549 |
| 6,547,427 | B1 | * | 4/2003 | Cheron et al. | 362/507 |
| 6,951,365 | B2 | * | 10/2005 | Chase et al. | 296/187.03 |
| 2004/0012975 | A1 | * | 1/2004 | Chase et al. | 362/505 |
| 2004/0125584 | A1 | * | 7/2004 | Arlon et al. | 362/21 |
| 2004/0136195 | A1 | * | 7/2004 | Chase | 362/390 |

FOREIGN PATENT DOCUMENTS

| DE | 19944670 A | 3/2001 |
|---|---|---|
| DE | 10020658 A | 10/2001 |
| FR | 2501334 | 9/1982 |

* cited by examiner

*Primary Examiner*—Paul N. Dickson
*Assistant Examiner*—Toan C. To
(74) *Attorney, Agent, or Firm*—Morgan & Finnegan LLP (57) ABSTRACT

The invention relates to a motor vehicle headlight which comprises, on the one hand, an impact member displaceable between a position of use and a deployed position in which it may come into contact with an obstacle in the event of an impact of the latter with the headlight, and, on the other hand, a safety device able to cause the displacement of the impact member from its position of use to its deployed position.

17 Claims, 11 Drawing Sheets

MOTOR HEADLIGHT COMPRISING AN IMPACT MEMBER

FIELD OF THE INVENTION

The invention relates to a motor vehicle headlight.

BACKGROUND OF THE INVENTION

As is known, headlights play, on account of their location, a major role in the passive safety of motor vehicles.

The prime concern to the progress made in the design of headlights are pedestrians for whom impacts with vehicles are extremely frequent. Although most accidents take place in town, that is to say at restricted speed (less than 40 km/h), the injuries suffered by pedestrians may have disastrous consequences.

A pedestrian impact generally comprises at least two phases. Initially, the pedestrian strikes the apron and/or the headlight. Subsequently, he strikes the hood.

In what follows, we shall be interested in the first phase, where the pedestrian strikes the headlight.

In the case of an adult pedestrian of average size, the part of the body coming directly into contact with the headlight is the hip, this possibly having serious consequences on the functioning of the lower limbs. Thus, numerous cases of hemiplegia are recorded.

In the case of a child pedestrian, it is his or her head that strikes the headlight. It is unnecessary to detail the consequences which may ensue.

Conscious of these problems, manufacturers have, already for some time now, proposed solutions aimed at reducing the injuries suffered by individuals in the event of a pedestrian impact.

Reference may in particular be made to French patent No. FR-2 501 334, or to its American equivalent No. U.S. Pat. No. 4,475,148.

Reference may also be made to the German patent application published under the number DE-100 30 373.

The solutions described by these documents propose that elastic means for absorbing part of the energy of the impact be interposed between the headlight and the structure of the vehicle.

Though these have enjoyed some commercial success, the safety that they guarantee to the pedestrian may however be improved.

Specifically, the capabilities of known headlights to absorb the energy of the impact may prove inadequate. It should be noted that this capability is generally related to the space available in the vicinity of the headlight. Now, having regard to the compactness demands of manufacturers, the space available is generally very limited.

Moreover, though the headlight itself represents a danger for the pedestrian, it should be noted that the most serious injuries frequently result from an impact with the bodywork elements which surround the headlight, these elements in fact exhibiting rigid edges.

This is why manufacturers are caught between relative flexibility of the headlight for best damping of the pedestrian impact, and relative rigidity so as to make the headlight into a rampart protecting the pedestrian from the surrounding bodywork elements.

Hitherto, no solution satisfactorily meeting these two criteria has been proposed.

Allowance should also be made for the appearance of new standards which are extremely demanding as regards passive safety and which are defined by bodies such as the EEVC (European Enhanced vehicle-Safety Committee) or the Euro NCAP (European New Car Assessment Programme).

The invention is aimed in particular at alleviating the aforesaid drawbacks of known headlights and in satisfying the new passive safety standards, by proposing a headlight which, while meeting the usual demands in terms of lighting and esthetics, improves the safety of pedestrians in the event of an impact.

SUMMARY OF THE INVENTION

For this purpose, the invention proposes a motor vehicle headlight which comprises, on the one hand, an impact member displaceable between a position of use and a deployed position in which it may come into contact with an obstacle in the event of an impact of the latter with the headlight, and, on the other hand, a safety device able to cause the displacement of the impact member from its position of use to its deployed position.

Within the sense of the invention, the term headlight is more generally understood to mean any vehicle lighting and/or signaling device.

Hence, the impact is forestalled, and the headlight travel during the impact is lengthened. This results in a greater energy absorption capability, and better protection of the pedestrian against the surrounding bodywork elements, to the benefit of the physical integrity of the individual.

The safety device may moreover comprise means for allowing the displacement of the impact member from its deployed position to its position of use and/or means for controlling the displacement of the impact member from its position of use to its deployed position, so as to further increase the capabilities of the headlight to absorb the energy of the impact.

According to a first embodiment, the headlight comprise a housing enclosing at least one light source and on which is mounted a protective outer lens able to transmit the light emitted by the source, and the impact member comprises the outer lens shield. It is in fact the latter that the pedestrian will strike most directly. The outer lens is, for example mounted movably with respect to the housing, and the safety device is able to cause the displacement of the outer lens with respect to the housing.

Thus, the safety device may comprise an expandable sleeve on which the outer lens is mounted, the sleeve being mounted on the housing and defining with the latter an expansion chamber, the safety device furthermore comprising a gas reservoir connected to the expansion chamber and able to release its gas therefrom so as to cause the expansion of the sleeve and the displacement of the outer lens with respect to the housing.

As a variant, the safety device comprises, on the one hand, a ram integral with the housing and whose piston is integral with the outer lens shield, and, on the other hand, a gas reservoir connected to the ram and able to release its gas therefrom so as to cause the displacement of the outer lens with respect to the housing.

According to another variant, the outer lens is deformable and defines, jointly with the housing, an expansion chamber, the safety device comprises a gas reservoir, connected to the expansion chamber, and able to release its gas therefrom so as to inflate the outer lens shield.

The housing may be furnished with a decompression port the opening of which is regulated by the safety device to allow the displacement of the outer lens from its deployed position to its position of use.

According to yet another variant, the outer lens is deformable and defines jointly with the housing an enclosure, and the safety device comprises an inflatable cushion able to deploy within this enclosure so as to inflate the outer lens shield.

According to a second embodiment, the headlight comprises a housing enclosing at least one light source and on which is mounted a protective outer lens able to transmit the light emitted by the source, and the impact member comprises both the housing and the outer lens.

In this case, the housing being mounted on the vehicle chassis, the safety device may comprise:
- either, on the one hand, an expansion chamber defined between the housing and the chassis, and on the other hand, a gas reservoir connected to the expansion chamber and able to release its gas therefrom so as to cause the displacement of the housing with respect to the chassis,
- or, on the other hand, a ram integral with the housing and whose piston is integral with the chassis, and, on the other hand, a gas reservoir connected to the ram and able to release its gas therefrom so as to cause the displacement of the housing with respect to the chassis.

According to a third embodiment, the impact member comprises an inflatable cushion able to deploy outside the headlight. The inflatable cushion is for example performed so as to at least partially cover the outer lens, when the former is in the deployed position.

In the invention, the expression "position of use" is understood to mean the state of the element considered when the headlight is operating normally, when the vehicle is undergoing no impact, no accident. Also the expression "deployed position" is understood to mean the position of the element when the impact occurs.

BRIEF DESCRIPTION OF THE DRAWINGS

The invention will be better understood on reading the following description, given merely by way of example and whilst referring to the appended drawings in which:

FIGS. 2 and 3 are sectional, diagrammatic side elevation views of a motor vehicle headlight as represented in figure 1, where the impact member is formed by the outer lens of the headlight, which outer lens is mounted slidably on the housing; FIG. 2 corresponds to an embodiment where an expandable sleeve is interposed between the outer lens and the housing; FIG. 3 corresponds to an embodiment where part of the outer lens forms the piston of a ram integral with the housing;

DESCRIPTION OF THE PREFERRED EMBODIMENTS

Figure 1:
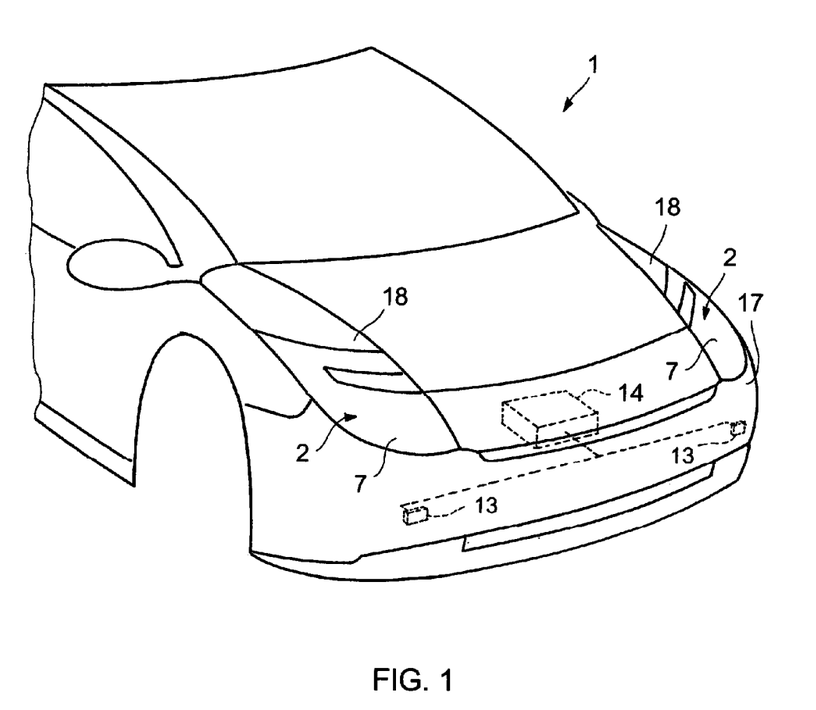
FIG. 1 is a partial perspective view, from the front, of a motor vehicle comprising, represented diagrammatically and in see-through fashion by dashed lines, a safety device intended to control the displacement of an impact member with which each headlight of the vehicle is provided.

Represented in FIG. 1 is a motor vehicle 1 furnished with projector headlights 2. Each headlight 2 comprises a housing 3 mounted on a chassis 4 formed by the structure of the vehicle 1.

The housing 3 encloses a certain number of internal components including at least one light source 5 mounted on a reflector 6 able to diffuse forwards of the vehicle 1 the light emitted by the source 5.

A transparent outer lens 7 is mounted on the housing 3 that the former encloses at the front in the manner of a cover and with which this outer lens defines an enclosure 8 in which are arranged the internal components 5, 6 of the headlight 2, components 5, 6 that the outer lens 7 is aimed at protecting.

The outer lens 7 comprises a front wall 9 through which it transmits out of the vehicle the light emitted by the light source 5, this front wall 9 being extended in the direction of the casing 3 by a skirt 10 via which the outer lens 7 is connected to the housing 3.

In the event of an impact with an obstacle, in particular a pedestrian, one wishes to forestall the impact so as to limit the bodily injuries suffered by the individual.

For this purpose, the headlight 2 comprises an impact member 11, which is displaceable between a position of use and a deployed position in which it is able to come into contact with the obstacle during the impact.

The headlight 2 furthermore comprises a safety device 12 able to cause at the appropriate moment, that is to say immediately before the impact with the obstacle, the displacement of the impact member 11 from its position of use to its deployed position.

For this purpose, at least one proximity detector 13 is provided in line with each headlight 2, this detector being linked to a control unit 14 which may be an independent processor, as represented in FIG. 1, but which may also be a component or a subprogram provided in a processor already assigned to other tasks of electronic management of the vehicle 1, such as ignition, injection, trajectory monitoring, etc.

The control unit 14 is linked to the safety device 12 integrated into the headlight 2, so as to control the actuation of the latter and the deployment of the impact member 11 as soon as an obstacle has been detected in the path of the headlight 2.

Furthermore, the safety device 12 can comprise means 15 for allowing the displacement of the impact member 11 from its deployed position to its position of use, so as to optimize the absorption of energy during the impact. These means 15 will be described subsequently.

According to a first embodiment, the impact member 11 comprises the outer lens 7 of the headlight 2. In this instance, the impact member is formed by the outer lens 7. According to a second embodiment, the impact member 11 comprises both the housing 3 and the outer lens 7 of the headlight 2 (in fact, the impact member is formed by the housing 3 and the outer lens 7). According to a third embodiment, the impact member 11 comprises or is formed by an inflatable cushion 16 with which the headlight 2 is equipped and which is intended to deploy outside the latter.

These various embodiments will be described successively while keeping the numerical references for the same elements.

Figure 10:
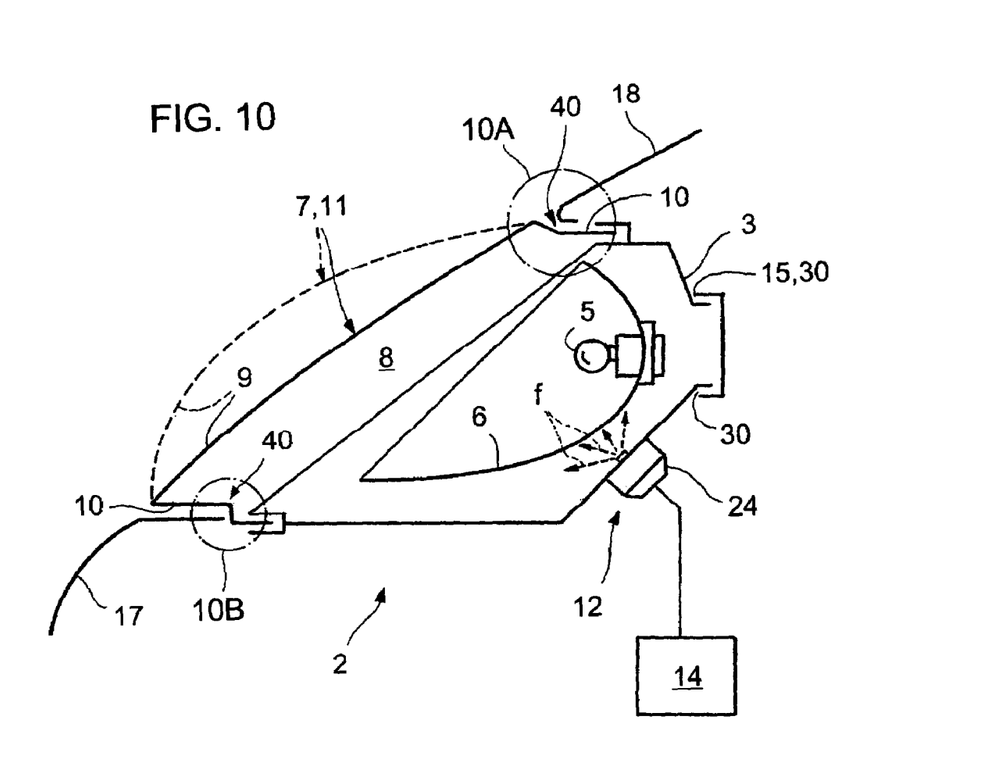
FIG. 10 is a view similar to FIG. 4, according to a variant embodiment where the outer lens of the headlight is furnished with fusible zones.
Figure 11:
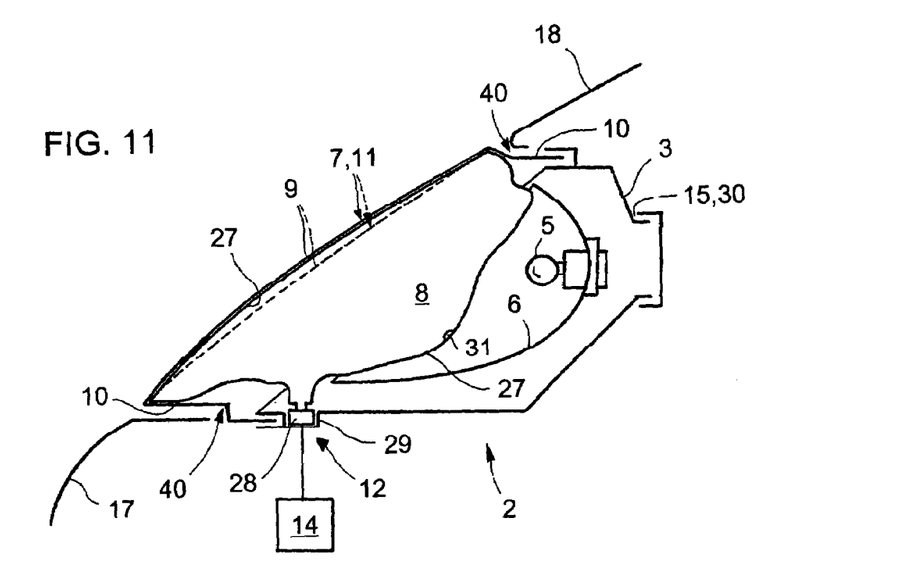
FIG. 11 is a view similar to FIG. 10, illustrating, in the position of use, a variant embodiment where the outer lens is furnished with fusible zones.
Figure 12:
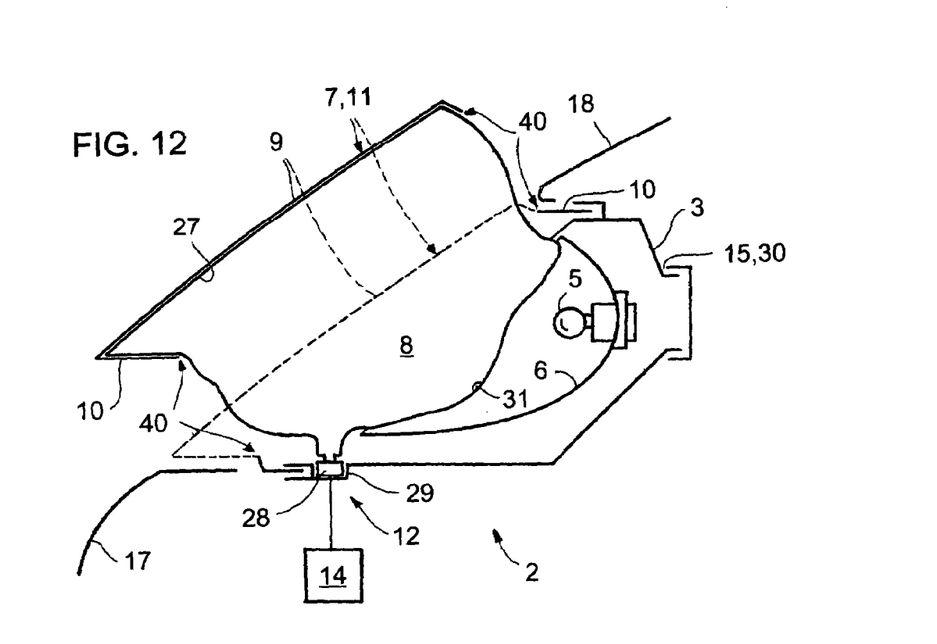
FIG. 12 is a view similar to FIG. 11, in the deployed position.

For the first embodiment there correspond six distinct variants of execution, illustrated respectively in FIGS. 2 to 5 and in FIGS. 10 to 12.

Figure 2:
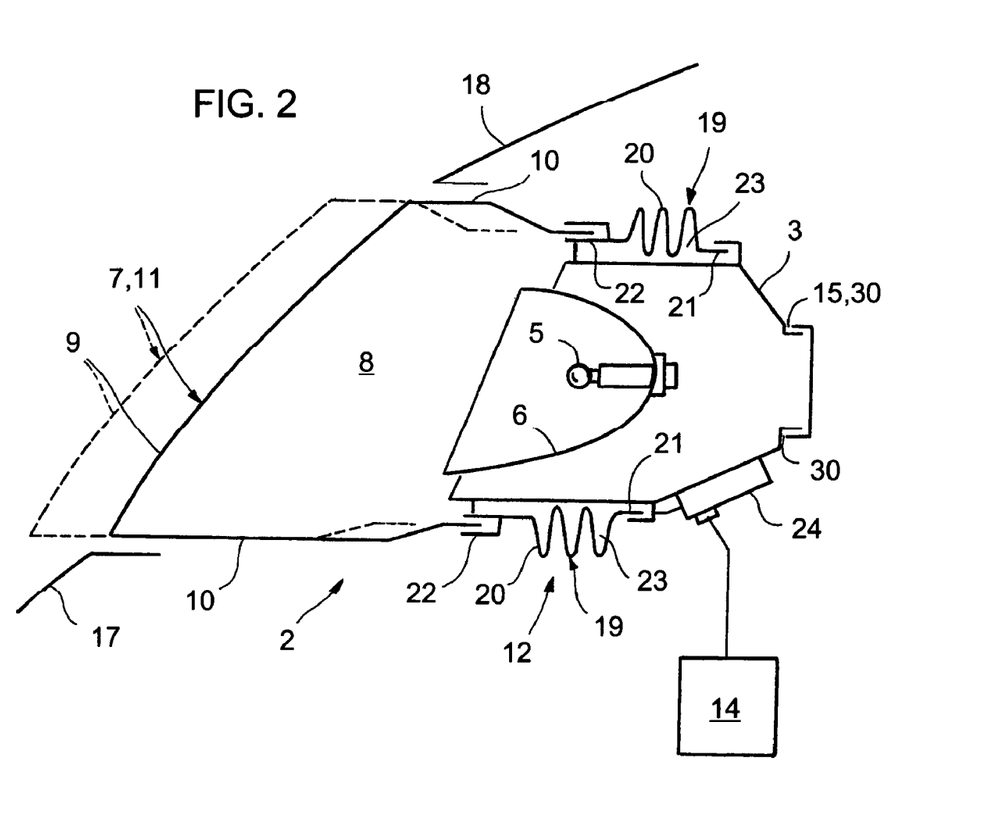
Figure 3:
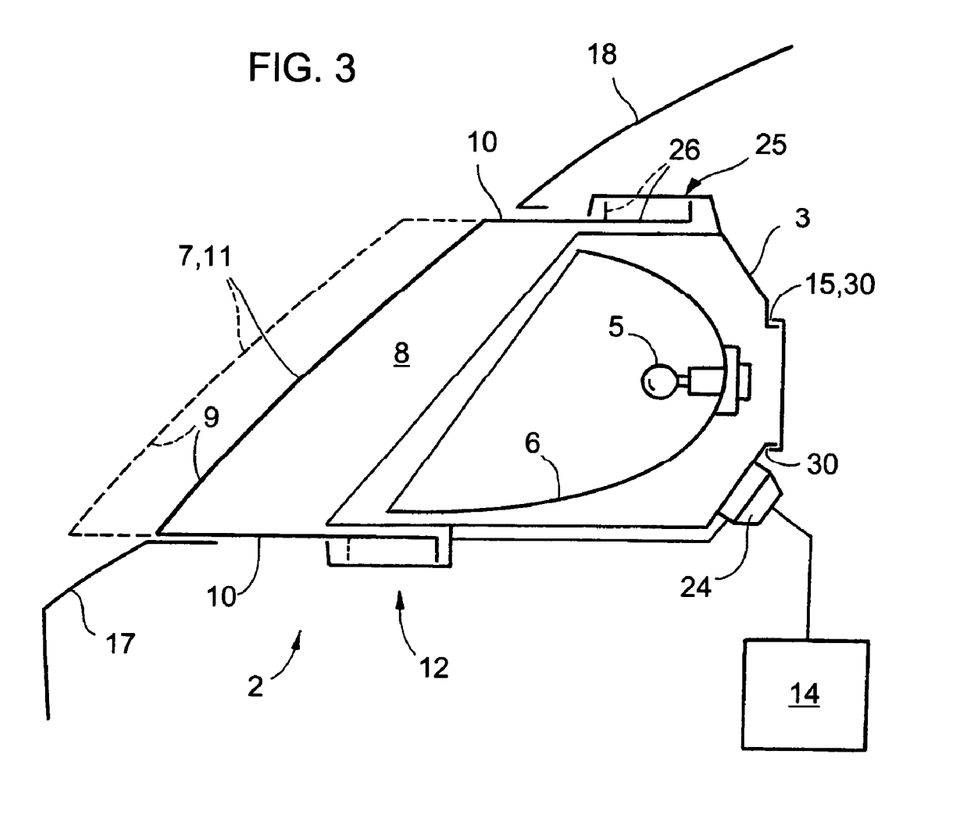

According to the first two variants, illustrated respectively in FIGS. 2 and 3, the outer lens 7 is mounted slidably with respect to the housing 3 between a position of use, represented by continuous lines in the figures, in which position the front wall 9 is flush with the surrounding bodywork elements 17, 18, and a deployed position, represented by discontinuous lines, in which the outer lens 7 projects with respect to the bodywork elements 17, 18.

According to the first variant, illustrated in FIG. 2, the safety device 12 comprises an expandable sleeve 19 on which the outer lens 7 is mounted. The sleeve 19 itself being mounted on the housing 3.

The sleeve 19, which is for example made of an elastomer, exhibits a pleated central portion 20 extended on one side by a rear end 21 fixed to the housing 3, and on the opposite side by a front end 22 to which the skirt 10 of the outer lens 7 is fixed.

The sleeve 19 defines together with the housing 3 an expansion chamber 23, while the safety device 12 comprises a gas reservoir 24 connected, on the one hand, electrically, to a control unit 14 and, on the other hand, fluidically, to the expansion chamber 23.

As soon as an obstacle has been detected by the detector 13, the control unit 14 actuates the opening of the reservoir 24 which releases its gas into the expansion chamber 23. The pressure of the gas causes the dilation of the pleated portion 20 and the expansion of the sleeve 19 whose front end 22 is propelled frontward, driving the outer lens 7 toward its deployed position.

According to the second variant, illustrated in FIG. 3, the safety device 12 comprises a ram 25 integral with the housing 3 and whose piston 26 is integral with the outer lens 7 (or vice versa). The ram 25 may be an add-on piece fixed rigidly to the housing 3, but it is in this instance formed directly by an external wall of the housing 3. As far as the piston 26 is concerned, it is formed, as may be seen in FIG. 3, by the skirt 10 of the glass outer lens 7.

The safety device 12 comprises, just as for the first variant, a gas reservoir 24 connected electrically to the control unit 14 and fluidically to the ram 25.

As soon as an obstacle has been detected by the detector 13, the control unit 14 actuates the opening of the reservoir 24 which releases its gas into the ram 25. The pressure of the gas causes the forward displacement of the piston 26, the latter thus driving the outer lens 7 toward its deployed position.

Figure 4:
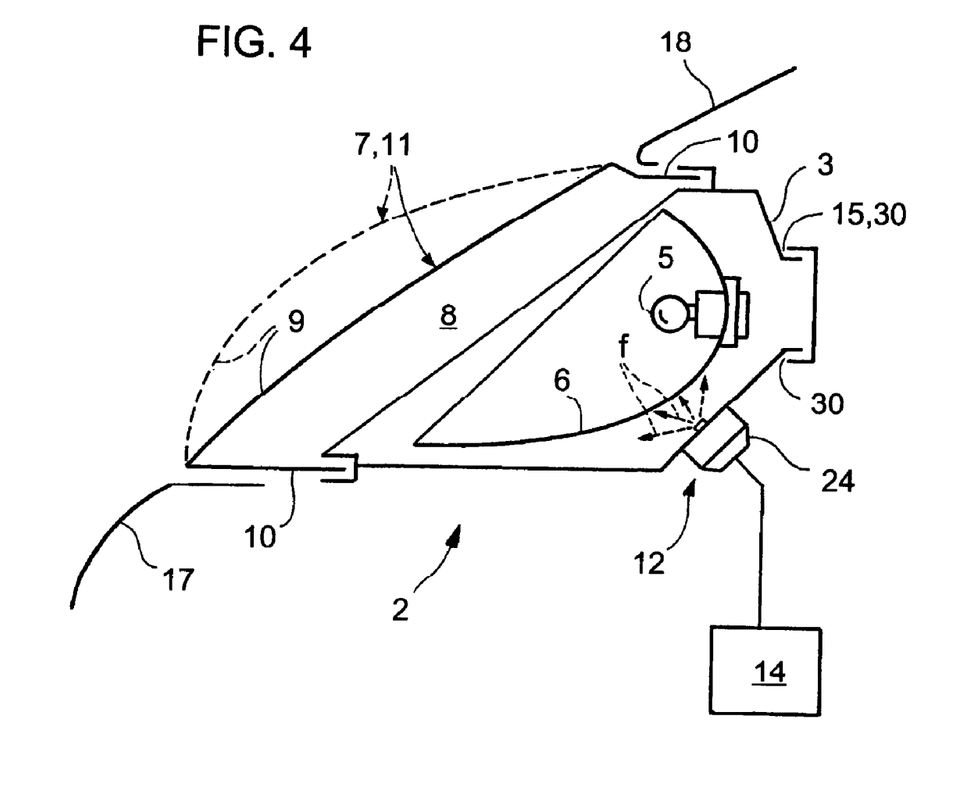
FIG. 4 is a view similar to FIGS. 2 and 3, where the outer lens of the headlight is inflatable and where a gas can be released directly in the enclosure formed jointly by the outer lens and the housing.
Figure 5:
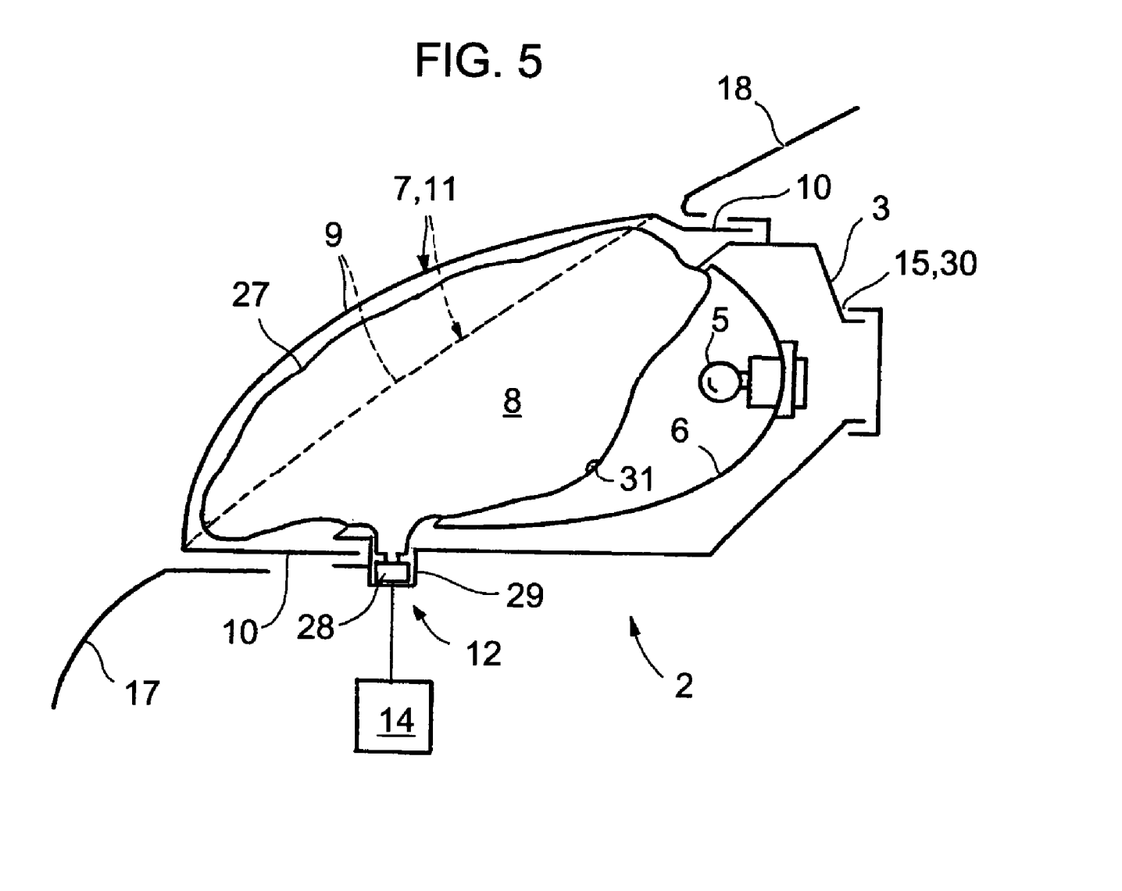
FIG. 5 is a view similar to FIG. 4, where the outer lens of the headlight is also inflatable, but where there is provided an inflatable cushion capable of deploying in the enclosure formed by the outer lens and the housing.

According to the third and the fourth variants, illustrated respectively in FIGS. 4 and 5, the outer lens 7 is deformable between a position of use, represented by continuous lines in FIG. 4 and by discontinuous lines in FIG. 5, in which position the front wall 9 is flush with the surrounding bodywork elements 17, 18, and a deployed position, represented by discontinuous lines in FIG. 4 and by continuous lines in FIG. 5, in which the front wall 9 is domed so as to project with respect to the bodywork elements 17, 18.

According to the third variant, illustrated in FIG. 4, the enclosure 8 constitutes an expansion chamber, while the safety device 12 comprises a gas reservoir 24 connected electrically to the control unit 14 and fluidically to the expansion chamber 8.

As soon as an obstacle has been detected by the detector 13, the control unit 14 actuates the opening of the reservoir 24 which releases its gas into the expansion chamber 8. The releasing of the gas is illustrated in FIG. 4 by the arrows f. The pressure of the gas causes the inflation of the front wall 9 of the outer lens 7 which thus occupies its deployed position.

According to the fourth variant, illustrated in FIG. 5, the safety device 12 comprises an inflatable cushion 27 capable of deploying in the expansion chamber 8 by bearing against the front wall 9 of the outer lens 7 so as to cause its inflation.

In the folded-back position, the cushion 27 is contained in a cartridge 28 fixed to the housing 3. The cartridge 28 is for example received in a housing 29 which, made in the housing 3, is open toward the expansion chamber 8 so as to allow the deployment therein of the inflatable cushion 26.

As we have seen, means 15 may be provided to allow, and possibly control, the recoil of the impact member 11.

These means 15 comprise for example a decompression port 30 made on the housing, and the opening of which is regulated by the control unit 14 so as to control the drop in the pressure in the enclosure 8 and thus to allow, by controlling it, the recoil of the outer lens 7. In the case of the fourth variant described hereinabove, a complementary port 31 will be provided, made directly in the cushion 27.

The fifth and sixth variants are close, in their principle, to respectively the third and fourth variants just described. Moreover, the common elements bear the same numerical references. They are distinguished therefrom in fact by the presence, on the outer lens 7, of fusible zones.

Figure 10A:
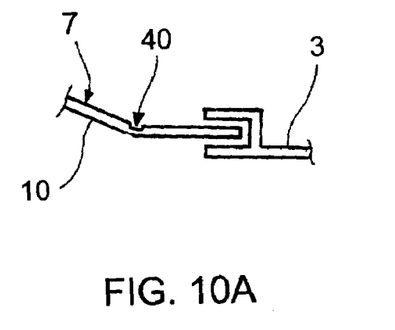
FIG. 10A is a detail view of the headlight of FIG. 10, according to the inset 10A chain-dotted in this figure.
Figure 10B:
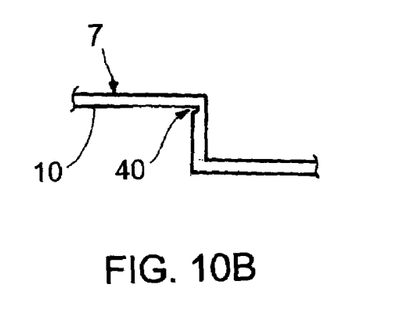
FIG. 10B is a detail view of the headlight of FIG. 10, according to the inset 10B depicted chain-dotted in this figure.

Thus, according to the fifth variant, illustrated in FIGS. 10, 10A and 10B, the outer lens is furnished with one or more fusible zones 40 which in this instance take the form of one or more grooves 40 made in the skirt 10, as is represented in FIG. 10A (where the skirt is represented in its upper part) and 10B (where the skirt is represented in its lower part).

In the event of an impact, the control unit 14 operates the reservoir 24 which releases its gas into the expansion chamber 8. The pressure in the chamber 8 grows, inflating the outer lens (as in the case of the third variant described hereinabove). When the gas pressure reaches a predetermined critical value, the fusible zones 40 break, causing the frontward ejection of the front wall 9.

This makes it possible in particular to prevent an overpressure in the expansion chamber 8 from causing the splintering of the outer lens 7, which could indeed prove dangerous for the pedestrian who is the victim of the impact.

According to the sixth variant, illustrated in FIGS. 11 and 12, the outer lens 7 is furnished with fusible zones 40 similar to those just described. These zones 40 break under the pressure exerted by the inflatable cushion 27 when the latter has reached a critical volume beyond which it can no longer continue its expansion in the chamber 8.

Just as in the case of the fifth variant just described, the outer lens 7 is projected frontward under the thrust of the cushion 27 which continues its expansion outside the chamber 8, thereby making it possible to further increase the absorption capabilities of the headlight while avoiding the splintering of the outer lens 7.

Figure 6:
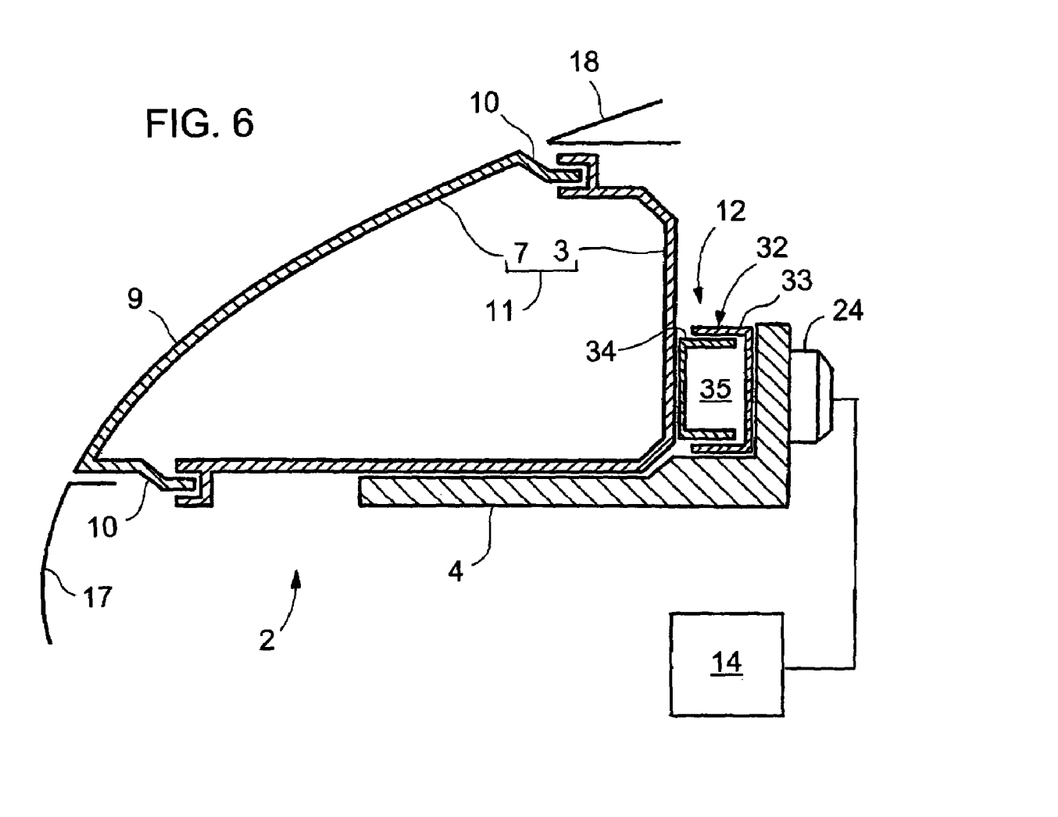
FIG. 6 is a sectional side elevation view of a headlight whose housing and outer lens jointly form an impact member, the housing being mounted slidably with respect to the fixed chassis of the vehicle, an expandable member being interposed between the housing and the chassis.
Figure 7:
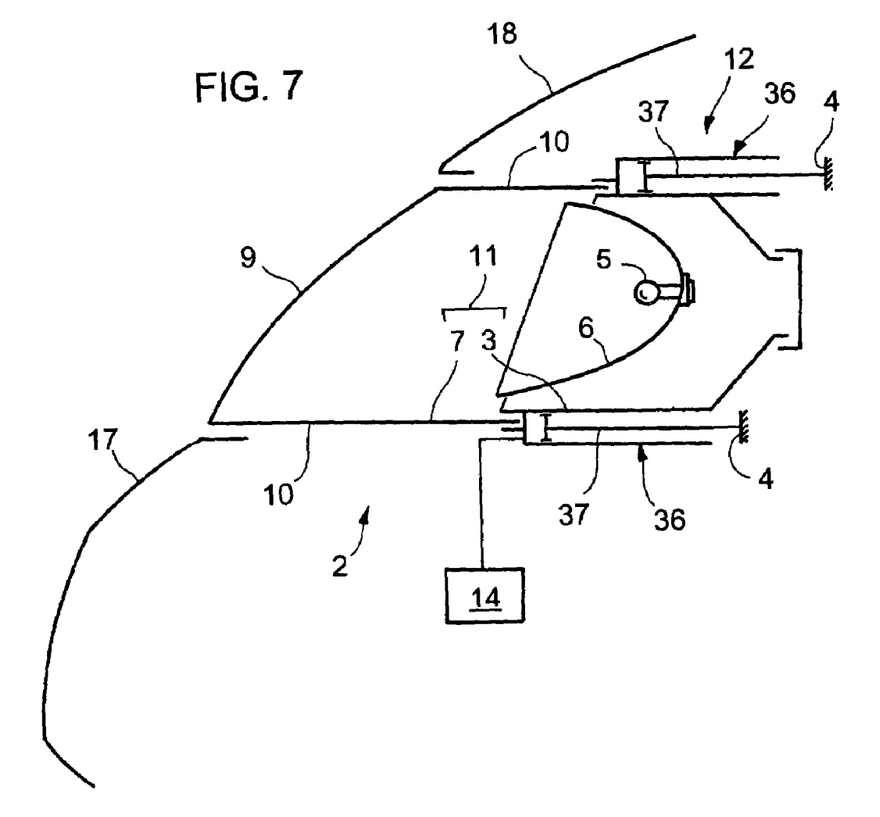
FIG. 7 is a view similar to FIG. 6, where the housing forms a ram whose piston is integral with the chassis, the housing being mounted slidably on the latter.

To the second embodiment there correspond two variants of execution illustrated respectively in FIG. 6 and in FIG. 7. The outer lens 7 is here rigidly fixed to the housing 3, while the latter is mounted slidably with respect to the chassis 4.

According to a first variant, the safety device 12 comprises an expandable box 32 arranged between the housing 3 and the chassis 4, and formed of two nestable elements 33, 34 which jointly define an expansion chamber 35 and of which one 33, fixed, bears against the chassis 4, while the other 34, mobile, bears against the housing 3, and can slide with respect to the fixed element 33.

The safety device 12 comprises a gas reservoir 24 connected electrically to the control unit 4 and fluidically to the expansion chamber 35 through the box 32.

As soon as an obstacle has been detected by the detector 13, the control unit 14 actuates the opening of the reservoir 24 which releases its gas into the expansion chamber 35. The pressure of the gas in the chamber 35 causes the expansion of the box 32, the mobile element 34 exerting a thrust on the housing 3 that causes its displacement with respect to the chassis 4, the mobile element 34 thus driving the impact member 11—that is to say, in this instance, the assembly formed by the housing 3 and the outer lens—toward its deployed position.

According to a second variant, the safety device 12 comprises a ram 36 integral with the housing 3 and whose piston 37 is integral with the chassis 4 (or vice versa). The safety device 12 also comprises a gas reservoir 24 connected electrically to the control unit 14 and fluidically to the ram 36.

As soon as an obstacle has been detected by the detector 13, the control unit 14 actuates the opening of the reservoir 24 which releases its gas into the ram 36, the latter driving the housing 3 toward its deployed position.

In order to allow, while controlling it, the recoil of the impact member 11, it is possible to furnish the ram 36 with a gate the opening of which is regulated by the control unit 14.

Figure 8:
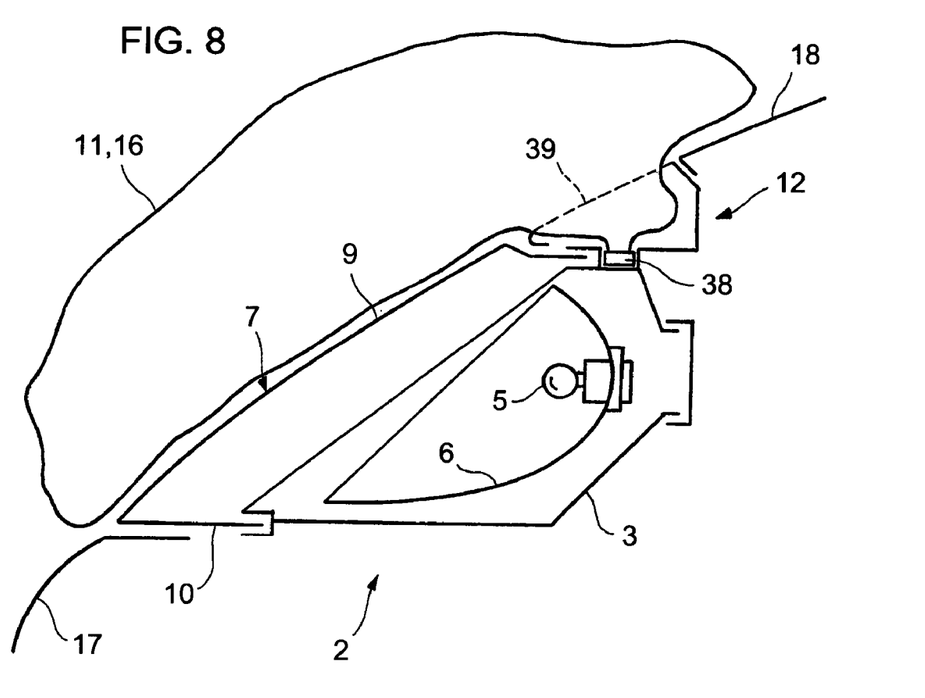
FIG. 8 is a view similar to FIGS. 2 to 7, where the headlight is equipped with an inflatable cushion capable of deploying outside the headlight by covering its outer lens.

According to the third embodiment, the impact member 11 is formed, as we have seen, by an inflatable cushion 16 integrated into the headlight 2. The cushion 16 is in this instance received, in the folded-back position, in a cartridge 38 fixed to the housing 3 and covered by a fusible or removable wall 39 that fuses or moves under the force exerted by the cushion 16 during its deployment.

Figure 9:
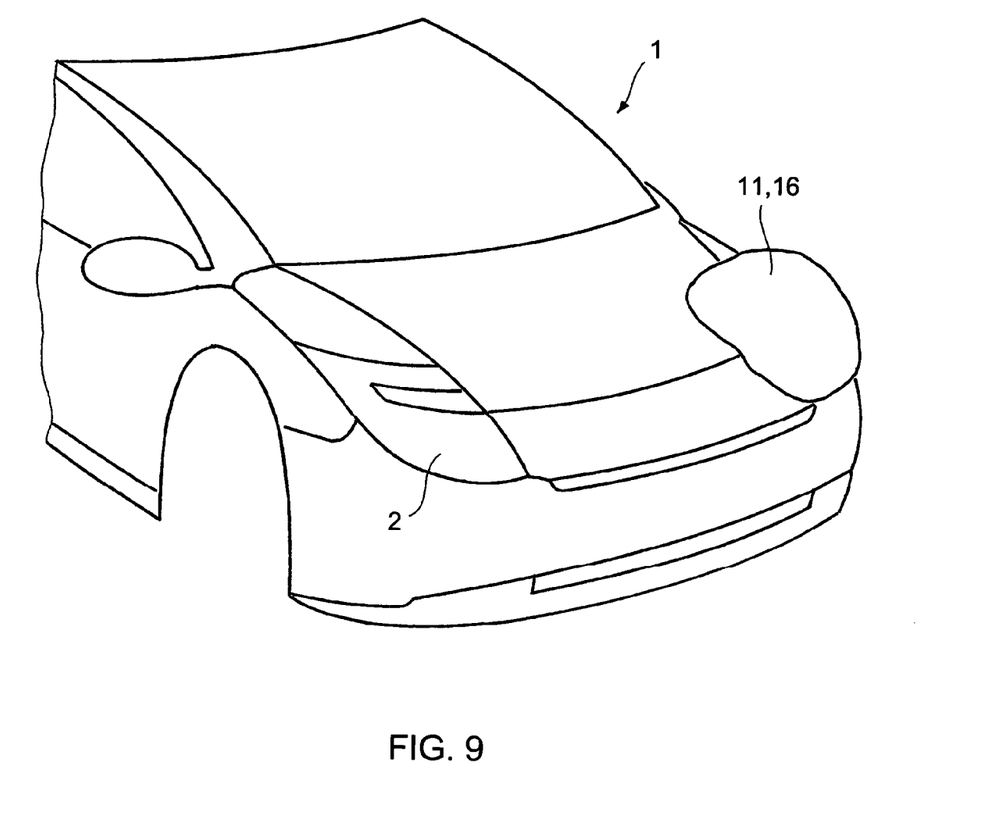
FIG. 9 is a view similar to FIG. 1, in which is represented the inflatable cushion of FIG. 7, in the deployed position where it covers the left headlight of the vehicle.

The cartridge 38 is linked to the control unit 14 which causes the deployment of the cushion 16 out of the headlight 2 as soon as an obstacle has been detected by the detector 13. As may be seen in FIGS. 8 and 9, the cushion 16 is preformed so as to be able to at least partially cover the front wall 9 of the outer lens 7 in the deployed position and thus to damp the impact of the obstacle against the headlight 2. In this instance, the cushion 16 covers the front wall 9 in full, thereby guaranteeing uniform safety whatever the location of the impact.

Moreover, in order to control the damping of the obstacle during the impact, it is possible to furnish the cushion 16 with one or more decompression ports 31.

Thus, whatever the embodiment adopted, it is possible to forestall the impact with the obstacle. The impact member 11 deploying frontward, it has a relatively substantial recoil travel when the obstacle strikes it, without this travel encroaching on the space reserved for the functional members (battery, air filter, screen washer liquid reservoir, etc.) usually arranged behind the headlight.

This results in the headlight 2 having increased capabilities of absorbing the energy of the impact, especially if means 15 are provided to allow, preferably while controlling it, the recoil of the impact member 11. It is furthermore possible, in particular at restricted speed, to prevent a pedestrian from striking the surrounding bodywork elements 17, 18.

Additionally, it should be noted that the various embodiments described do not necessitate a comprehensive revision of the design of the headlights. The safety of pedestrians is therefore ensured without generating any prohibitive additional cost. The subject of the invention is therefore a headlight designed to dampen the shock in the event of an impact between a pedestrian and the headlight, and in particular able to fulfill the conditions of draft European directive No. 70/156/EEC relating to pedestrian impact.

What is claimed is:

1. A motor vehicle headlight which comprises: an impact member displaceable between a position of use and a deployed position in which said impact member comes into contact with an obstacle during an impact and a safety device able to cause displacement of the impact member from said position of use to said deployed position prior to impact with the obstacle.

2. The headlight as claimed in claim 1, wherein the safety device comprises means for allowing displacement of the impact member from said deployed position to said position of use.

3. The headlight as claimed in claim 1, wherein the safety device comprises means for controlling the displacement of the impact member from said position of use to said deployed position.

4. The headlight as claimed in claim 1, wherein the headlight comprises housing enclosing at least one light source and on which is mounted a protective outer lens, able to transmit the light emitted by the source, the impact member comprises the outer lens.

5. The headlight as claimed in claim 4, wherein the outer lens is mounted movably with respect to the housing, and wherein the safety device is able to cause the displacement of the outer lens with respect to the housing.

6. A motor vehicle headlight which comprises: an impact member displaceable between a position of use and a deployed position in which said impact member comes into contact with an obstacle during an impact of the obstacle with the headlight, and a safety device able to cause the displacement of the impact member from said position of use to said deployed position, wherein the headlight comprises a housing enclosing at least one light source and on which is mounted a protective outer lens, able to transmit the light emitted by the source, the impact member comprises the outer lens, wherein the outer lens is mounted movably with respect to the housing, and wherein the safety device is able to cause the displacement of the outer lens with respect to the housing, and wherein the safety device comprises an expandable sleeve on which the outer lens is mounted, the sleeve being mounted on the housing and defining an expansion chamber, the safety device furthermore comprising a gas reservoir connected to the expansion chamber and able to release its gas therefrom so as to cause the expansion of the sleeve and the displacement of the outer lens with respect to the housing.

7. The headlight as claimed in claim 5, wherein the safety device comprises a ram integral with the housing having a piston integral with the outer lens, and a gas reservoir connected to the ram and able to release gas therefrom so as to cause the displacement of the outer lens with respect to the housing.

8. The headlight as claimed in claim 5, wherein the outer lens is deformable and defines, jointly with the housing, an expansion chamber, and wherein the safety device comprises a gas reservoir, connected to the expansion chamber, and able to release gas therefrom so as to inflate the outer lens.

9. The headlight as claimed in claim 5, wherein the housing is furnished with a decompression port having an opening which is regulated to allow displacement of the outer lens from said deployed position to said position of use.

10. The headlight as claimed in claim 5, wherein the outer lens is deformable and defines jointly with the housing an enclosure, and wherein the safety device comprises an inflatable cushion able to deploy within said enclosure so as to inflate the outer lens.

11. The headlight as claimed in claim 1, wherein, the headlight comprises a housing enclosing at least one light source and on which is mounted a protective outer lens able to transmit light emitted by the source, the impact member comprises the housing and the outer lens.

12. The headlight as claimed in claim 11, wherein, the housing is mounted on a chassis, the safety device comprises an expansion chamber defined between the housing and the chassis, and a gas reservoir connected to the expansion chamber and able to release gas therefrom so as to cause the displacement of the housing with respect to the chassis.

13. The headlight as claimed in claim 11, wherein, the housing is mounted on a chassis, the safety device comprises a ram integral with the housing and having a piston integral with the chassis, and a gas reservoir connected to the ram and able to release gas therefrom so as to cause displacement of the housing with respect to the chassis.

14. The headlight as claimed in claim 1, wherein the impact member comprises an inflatable cushion able to deploy outside the headlight.

15. The headlight as claimed in claim 14, which comprises a housing enclosing at least one light source and on which is mounted an outer lens able to transmit light emitted by the source, and wherein deployment of the inflatable cushion is preformed so as to at least partially cover the outer lens in the deployed position.

16. The headlight as claimed in claim 15, which dampens shock in the event of an impact of a pedestrian against the headlight.

17. A motor vehicle headlight comprising: an impact member displaceable from a position of use to a projected and deployed position in which said impact member comes into contact with an obstacle during an impact, and a safety device for displacing said impact member toward the obstacle from said first position to said second projected and deployed position.

* * * * *